United States Patent
Naito (10) Patent No.: US 12,368,961 B2
(45) Date of Patent: Jul. 22, 2025

(54) APPARATUS, METHOD, AND STORAGE MEDIUM

(71) Applicant: CANON KABUSHIKI KAISHA, Tokyo (JP)

(72) Inventor: Shoko Naito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 341 days.

(21) Appl. No.: 17/834,793

(22) Filed: Jun. 7, 2022

(65) Prior Publication Data
US 2022/0400206 A1     Dec. 15, 2022

(30) Foreign Application Priority Data

Jun. 10, 2021   (JP) .................................. 2021-097308

(51) Int. Cl.
*H04N 23/695*   (2023.01)
*G06T 7/246*    (2017.01)

(52) U.S. Cl.
CPC ........... *H04N 23/695* (2023.01); *G06T 7/246* (2017.01)

(58) Field of Classification Search
CPC ...... G01S 3/7864; H04N 23/695; G06T 7/246
USPC .......................................... 348/169; 382/103
See application file for complete search history.

(56) References Cited

U.S. PATENT DOCUMENTS

| | | | |
|---|---|---|---|
| 2018/0295270 A1* | 10/2018 | Oshima | H04N 23/6811 |
| 2022/0375256 A1* | 11/2022 | Endo | G01S 13/08 |
| 2024/0040271 A1* | 2/2024 | Mitsuma | H04N 23/633 |

FOREIGN PATENT DOCUMENTS

| | | |
|---|---|---|
| JP | 2006509422 A | 3/2006 |
| JP | 2006246354 A | 9/2006 |
| JP | 2008298860 A | 12/2008 |
| JP | 2009033450 A | 2/2009 |
| JP | 2015028780 A | 2/2015 |
| JP | 2020072317 A | 5/2020 |
| JP | 2020161992 A | 10/2020 |

* cited by examiner

*Primary Examiner* — Christopher S Kelley
*Assistant Examiner* — Ana Picon-Feliciano
(74) *Attorney, Agent, or Firm* — Canon U.S.A., Inc. IP Division

(57) ABSTRACT

An apparatus includes a detection unit configured to detect a tracking target included in an angle of view based on a signal indicating a pixel position and time at which a change of luminance has occurred, an estimation unit configured to estimate movement of the detected tracking target, and a determination unit configured to determine a control value for changing the angle of view based on the estimated movement of the tracking target.

17 Claims, 7 Drawing Sheets

FIG.5

APPARATUS, METHOD, AND STORAGE MEDIUM

BACKGROUND

Technical Field

The aspect of the embodiments relates to an object tracking technique using an event-based sensor.

Description of the Related Art

There has been known an event-based sensor which outputs a change of luminance as an address event signal for each pixel on a real-time basis (Japanese Patent Application Laid-Open No. 2020-72317).

SUMMARY

According to an aspect of the embodiments, an apparatus includes a detection unit configured to detect a tracking target included in an angle of view based on a signal indicating a pixel position and time at which a change of luminance has occurred, an estimation unit configured to estimate movement of the detected tracking target, and a determination unit configured to determine a control value for changing the angle of view based on the estimated movement of the tracking target.

Further features of the disclosure will become apparent from the following description of exemplary embodiments with reference to the attached drawings.

DESCRIPTION OF THE EMBODIMENTS

Hereinafter, exemplary embodiments of the disclosure will be described in detail with reference to the appended drawings. Configurations described in the below exemplary embodiments are merely examples, and the disclosure is not limited to the configurations illustrated in the appended drawings.

A first exemplary embodiment will be described. Conventionally, a synchronous-type photoelectric conversion element which captures image data (frame) in synchronization with a synchronization signal such as a vertical synchronization signal has been used for an imaging apparatus. Because the above-described general synchronous-type photoelectric conversion element can only acquire image data every cycle of the synchronization signal (e.g., every 1/60 sec.), it is difficult to respond to a case where high-speed processing is necessary. Therefore, there is provided a non-synchronous photoelectric conversion element which detects a change of luminance as an address event for each pixel address on a real-time basis. The above-described photoelectric conversion element which detects an event for each pixel address is called a dynamic vision sensor (DVS) (hereinafter referred to as an event-based sensor). Because an imaging apparatus using the event-based sensor can detect movement of an object at high sensitivity, the imaging apparatus can be used for tracking a detected moving object.

However, in a case where a moving object is tracked by the imaging apparatus using the event-based sensor for detecting a change of luminance of the moving object, a change of luminance hardly occurs because the imaging apparatus tracks the moving object at a same speed as that of the moving object. In the present exemplary embodiment, an imaging apparatus using the event-based sensor controls an imaging range based on movement of the object to create a situation where a change of luminance occurs, so that the imaging apparatus can track the object precisely.

Figure 1:
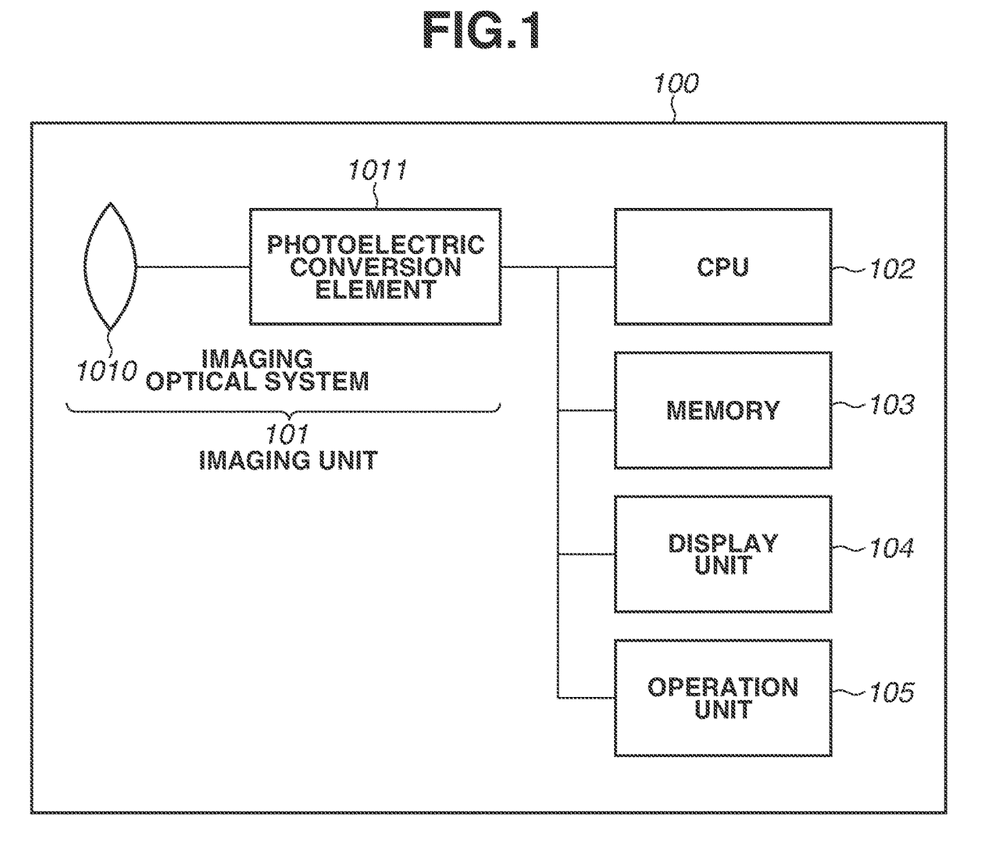
FIG. 1 is a block diagram illustrating an example of a hardware configuration of an information processing apparatus.

<Hardware Configuration of Imaging Apparatus 100: FIG. 1>

FIG. 1 is a block diagram illustrating an example of a hardware configuration of an imaging apparatus (information processing apparatus) 100.

The imaging apparatus 100 includes an imaging unit 101 including an imaging optical system 1010 and a photoelectric conversion element 1011, a central processing unit (CPU) 102, a memory 103, a display unit 104, and an operation unit 105. The photoelectric conversion element 1011 is an event-based sensor which outputs an address event signal corresponding to receive incident light. The event-based sensor detects a change of luminance as an event for each pixel, and the address event signal indicates a pixel position and time at which a change of luminance has occurred. Specifically, the imaging optical system 1010 is a light receiving lens which receives incident light and forms an image on the photoelectric conversion element 1011. The CPU 102 reads and executes an operating system and other programs stored in the memory 103 to execute calculation and logical determination of various types of processing by controlling respective constituent elements connected thereto. The processing executed by the CPU 102 includes information processing according to the present exemplary embodiment. The CPU 102 further executes driving control of a focus and an aperture of the imaging optical system 1010 and driving control of the photoelectric conversion element 1011. For example, the memory 103 is a hard disk drive or an external storage device which stores programs and various types of data relating to the information processing according to the present exemplary embodiment. The display unit 104 is a display device which displays a calculation result acquired by the imaging apparatus 100 according to an instruction from the CPU 102. The display device can be of any type, so that the display unit 104 can be a liquid crystal display device, a projector, or a light emitting diode (LED) indicator. For example, the operation unit 105 is a user interface such as a touch panel, a keyboard, a mouse, or a robot controller, which accepts an instruction input by the user. In addition, the imaging apparatus 100 may include a mechanism other than the hardware configurations described above, and a function for executing image processing and a function for executing analysis (tracking) processing on the image may respectively be included in different devices.

Figure 2A:
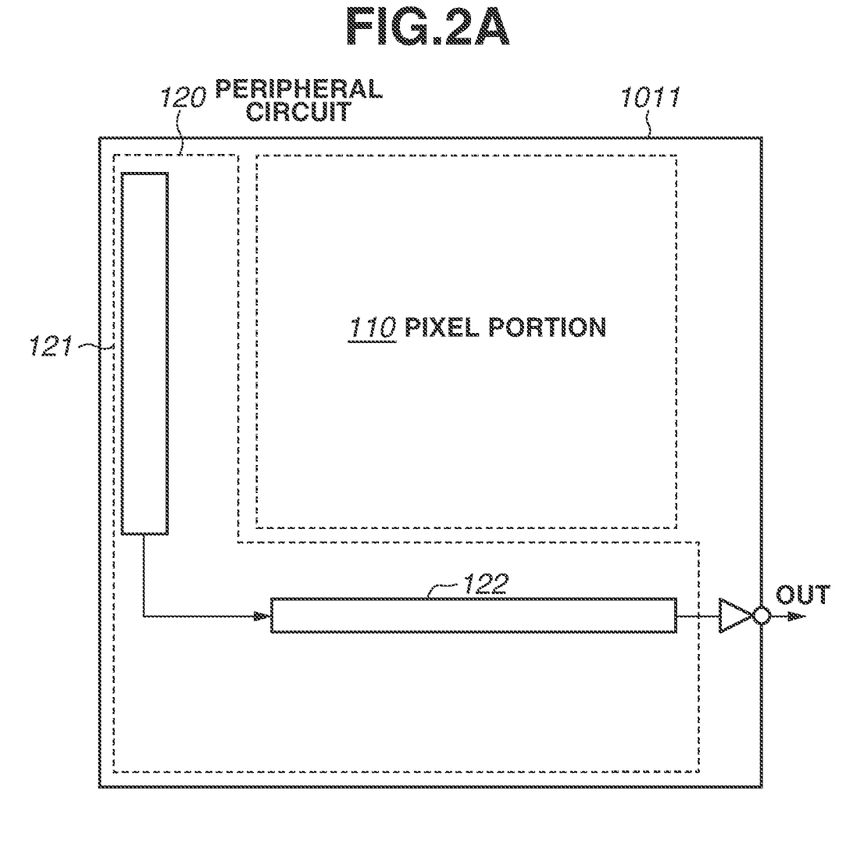
FIGS. 2A and 2B are diagrams illustrating an example of a configuration of an event-based sensor.
Figure 2B:
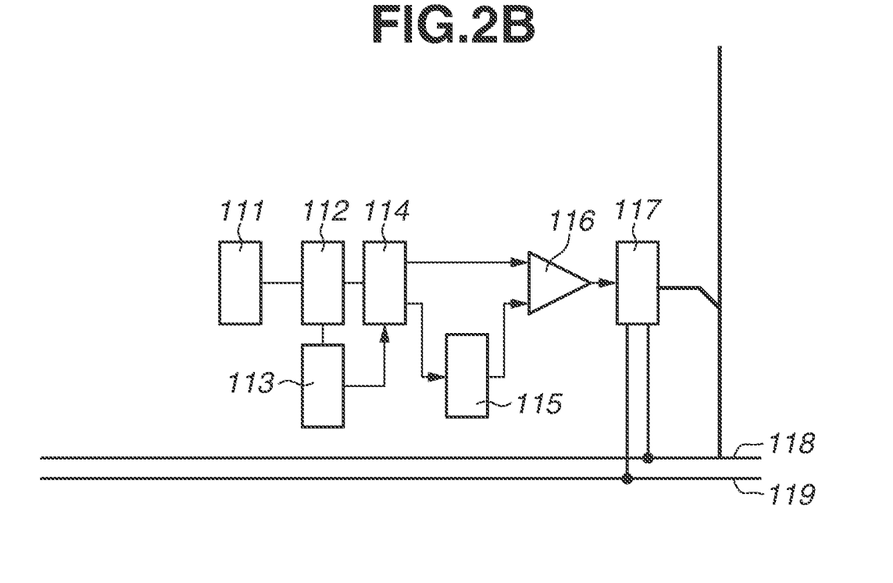

<Photoelectric Conversion Element 1011: FIGS. 2A and 2B>

One example of the photoelectric conversion element (i.e., event-based sensor) according to the present exemplary embodiment will be described. The event-based sensor counts the number of photons incident thereon, and determines a timing when the number of counted photons exceeds a predetermined threshold. The event-based sensor also measures a time (clock frequency) required for the number of photons to be a first threshold or more for each pixel, and detects a change of luminance by comparing the required times. Specifically, in a case where the required time measured last time and the latest required time are T0 and T respectively, the event-based sensor detects a change of luminance in a negative direction if a difference of T−T0 is a second threshold or more. If a difference of T0−T is the second threshold or more, the event-based sensor detects a change of luminance in a positive direction. If a difference between T and T0 is less than the second threshold, the event-based sensor does not detect a change of luminance. In addition, the second threshold is a value of 0 or more, and is set depending on a preset setting value or another parameter.

Hereinafter, a configuration thereof will be described in detail. FIG. 2A is a diagram illustrating an example of the configuration of the photoelectric conversion element 1011. The photoelectric conversion element 1011 includes a pixel portion 110 and a peripheral circuit 120. The peripheral circuit 120 includes a vertical arbitration circuit 121 and a horizontal reading circuit 122.

FIG. 2B is a diagram illustrating an example of the configuration of each pixel portion 110 which constitutes the event-based sensor. The pixel portion 110 includes a photoelectric conversion portion 111, a pixel counter 112, a time counter 113, a first determination circuit 114, a memory 115, a comparator 116, a second determination circuit 117, a response circuit 118, and a selection circuit 119. The photoelectric conversion portion 111 includes a single-photon avalanche diode (SPAD) operating in a Geiger-mode, and the number of photons incident on the photoelectric conversion portion 111 is counted by the pixel counter 112. The time counter 113 counts time the photons are incident on the photoelectric conversion portion 111. Because the SPAD is used for the event-based sensor, a change of luminance can be detected at a level of a single photon. By detecting a change of luminance at a level of a single photon, an address event signal can also be acquired in a dark field of view at night.

When the number of photons counted by the pixel counter 112 has reached the first threshold, the first determination circuit 114 stops counting of time executed by the time counter 113. A past count value acquired by the time counter 113 is stored in the memory 115, and a difference between the current count value and the past count value of the time counter 113 is acquired by using the comparator 116.

In a case where a difference between the count values is a second threshold or more, the second determination circuit 117 transmits a request signal to the vertical arbitration circuit 121 via the response circuit 118. The response circuit 118 receives a response indicating permission or prohibition of output of the address event data from the vertical arbitration circuit 121. If a difference between the count values is less than the second threshold, the second determination circuit 117 does not transmit the request signal.

When the response circuit 118 receives a response indicating permission of output, the selection circuit 119 outputs the count value acquired by the time counter 113 to the horizontal reading circuit 122. The horizontal reading circuit 122 outputs the received count value as an output signal to a detecting unit 201 from the photoelectric conversion element 1011.

A difference between the count values calculated by the comparator 116 corresponds to an inverse number of incident frequency of photons. Therefore, the photoelectric conversion element 1011 according to the present exemplary embodiment has a function for measuring a change of luminance, i.e., a change of incident frequency of photons. Further, the photoelectric conversion element 1011 uses the second determination circuit 117 to output the address event when a difference between intervals of time for the number of incident photons to reach the first threshold is a second threshold or more. In other words, the photoelectric conversion element 1011 outputs the incident frequency when a difference between the incident frequencies is the second threshold or more, and does not output the incident frequency when a difference is less than the second threshold. Through the above-described configuration, it is possible to realize a non-synchronous photoelectric conversion element which detects a change of luminance as an address event for each pixel address on a real-time basis.

<Variation of Photoelectric Conversion Element>

In the above-described exemplary embodiment, the SPAD is used for the photoelectric conversion portion 111, and the photoelectric conversion element 1011 that detects a change of incident frequency of photons by measuring the incident time of the photons is used. However, a configuration different from the configuration illustrated in FIG. 2 can also be employed as long as the photoelectric conversion element 1011 is a non-synchronous photoelectric conversion element which detects a change of luminance as an address event on a real-time basis. For example, as discussed in Japanese Patent Application Laid-Open No. 2020-72317, a photoelectric conversion element that detects a change of luminance as a change of voltage can also be used.

Figure 3:
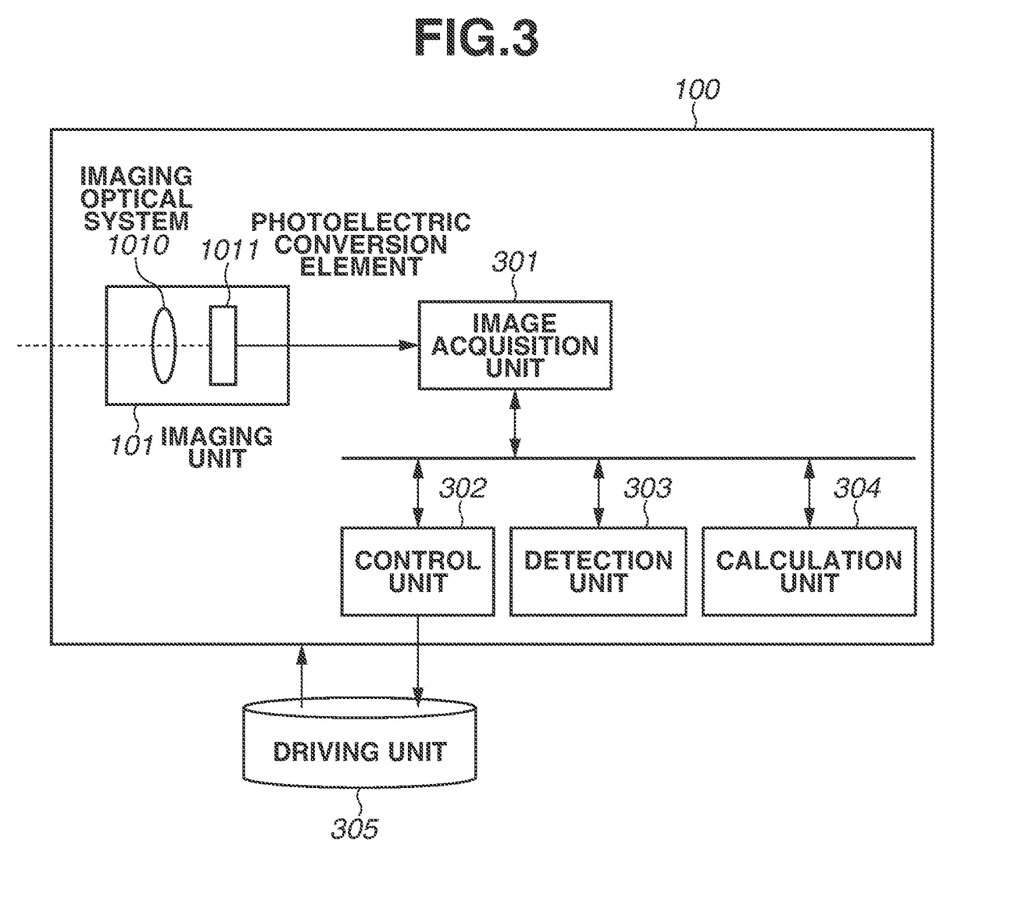
FIG. 3 is a block diagram illustrating an example of a functional configuration of the information processing apparatus.

<Example of Functional Configuration of Imaging Apparatus 100: FIG. 3>

FIG. 3 is a block diagram illustrating an example of a functional configuration of the imaging apparatus (information processing apparatus) 100. The imaging apparatus 100 includes an imaging unit 101 including an imaging optical system 1010 and a photoelectric conversion element 1011, an image acquisition unit 301, a control unit 302, a driving unit 305, a detection unit 303, and a calculation unit 304.

The imaging unit 101 includes the imaging optical system 1010 and the photoelectric conversion element 1011. Light passing through the imaging optical system 1010 forms an image on the photoelectric conversion element 1011, and is converted into an electric signal. Then, the image acquisition unit 301 outputs the converted signal as an image signal. In other words, the image acquisition unit 301 acquires an address event signal indicating a pixel position and time at which a change of luminance has occurred. The imaging unit 101 specifically refers to a lens body. The imaging optical system 1010 includes a plurality of lenses and holding members, and includes a mechanical structure for executing aperture control, zoom control, and focus control. Further, the imaging optical system 1010 may be controlled by an imaging optical control unit (not illustrated). The photoelectric conversion element 1011 detects a change of a luminance value of an object, and outputs a signal when the change is detected. The image acquisition unit 301 executes correction processing and development processing on the electric signal converted by the photoelectric conversion element 1011 and converts the electric signal into frame data by integrating the output signals of a certain period of time, and outputs the frame data as an image signal. In other words, based on the address event signal indicating a pixel position and time at which a change of luminance has occurred, the image acquisition unit 301 acquires an image illustrating a position of the pixel having a change of luminance within a predetermined period (i.e., frame data describing a pixel having a change of luminance within a predetermined period). The detection unit 303 detects a tracking target based on this image signal. In other words, based on the address event signal indicating a pixel position and time at which a change of luminance has occurred, the detection unit 303 detects a tracking target included in an imaging range. An object determined as a moving object may be detected as a tracking target, or an object having an outer shape conforming to a shape previously stored as a shape of the tracking target may be detected as a tracking target from among the objects determined as moving objects. Specifically, a moving object such as a human or a vehicle which can move by oneself may be detected as a tracking target object. A detection method executed by the detection unit 303 will be described below. The calculation unit 304 estimates a motion vector (information indicating a speed and a moving direction) of a tracking target when the tracking target is detected by the detection unit 303.

Based on the estimated motion vector of the tracking target, the control unit 302 determines a driving angle for controlling a driving direction of the imaging apparatus 100. A control value for changing the imaging range may be determined by the calculation unit 304. Calculation methods of the motion vector and the driving angle will be described below. Based on the driving angle received from the calculation unit 304, the control unit 302 transmits a control signal to the driving unit 305. In other words, based on the movement of the tracking target, the control unit 302 determines a control value for changing the imaging range. Herein, the control signal (control value) refers to a control parameter for changing the imaging range (angle of view) of the imaging apparatus 100, specifically, a numerical value of a driving angle or a speed thereof. Accordingly, in the below-described exemplary embodiment, processing for controlling and changing a position (moving amount) and an orientation (driving direction) of the driving unit 305 will be described. This processing is executed in order to change the imaging range (angle of view) of the imaging apparatus 100.

The driving unit 305 includes a driving mechanism having at least one shaft capable of changing the imaging direction (imaging range) of the imaging apparatus 100 based on the control signal (control value) received from the control unit 302. For example, the driving mechanism of the imaging apparatus 100 is a mechanism capable of rotating in a predetermined range of 0 to 360 degrees about an axis, which is a perpendicular line perpendicular to a ground surface. The driving mechanism is not limited to the above-described example, and the imaging apparatus 100 may include a pan-tilt-zoom (PTZ) mechanism, or may be movable by itself.

<Detection Unit 303>

A method of detecting presence or absence of movement of an object, executed by the detection unit 303, will be described in detail.

First, when the detection unit 303 detects a pixel output, the detection unit 303 compares the number of connected pixels indicated by the movement information with a first threshold N1. If the number of connected pixels is the first threshold N1 or more, the detection unit 303 determines that the pixel output is not noise, and advances the processing to collation processing of feature point data. Herein, "the number of connected pixels" refers to the number of pixels having pixel outputs, which are connected (adjacent) to each other in a two-dimensional surface in a same time stamp (or in an optional period). Through the above-described method, a detected moving object can be specified as a tracking target.

Further, from among detected moving objects, an object having a feature (e.g., outer shape) conforming to a previously-stored feature of the tracking target may be specified as a tracking target. In this case, the imaging apparatus 100 includes a storage unit (not illustrated) for previously storing the feature of the tracking target. A feature indicating an outer shape of an object is extracted, from the image signal through the existing edge analysis processing, based on a change of a luminance value of an image signal acquired by the image acquisition unit 301, from which a moving object has been detected. Then, the extracted feature is compared with the feature of the tracking target stored in the storage unit through image recognition processing such as machine learning, and an object having a degree of similarity greater than or equal to a threshold is recognized as a tracking target. An image used for the analysis is an integrated image converted into frame data by the image acquisition unit 301.

<Driving Method>

Figure 4A:
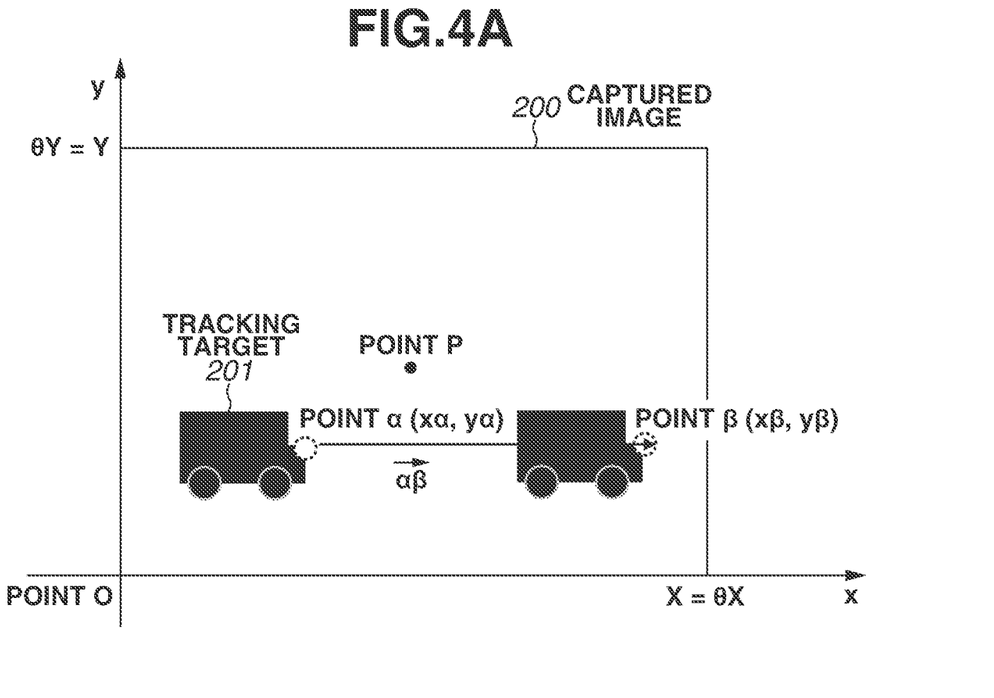
FIGS. 4A and 4B are schematic diagrams illustrating examples of a tracking method of an object.

FIG. 4A is a schematic diagram illustrating a method of determining a driving angle of the driving unit 305 of the imaging apparatus 100 according to the first exemplary embodiment. The imaging apparatus using an event-based sensor acquires and outputs a change of luminance caused by the movement of the object. Therefore, if the imaging apparatus is driven with the same movement as the movement of the object when tracking is to be executed, there is no difference between the movement of the imaging apparatus and the movement of the tracking target. As a result, the tracking target cannot be acquired because the luminance remains unchanged.

Accordingly, in the present exemplary embodiment, with reference to FIG. 4A, a method of tracking a tracking target while changing at least any one of the driving speed and the driving angle of the driving unit 305 will be described.

FIG. 4A is a diagram illustrating a captured image 200 imaged by the imaging apparatus 100 by making a point P as a center, and an x-axis and a y-axis are defined with respect to the captured image 200 by taking a point O as an origin. In other words, an imaging range of the imaging apparatus 100 is expressed in two dimensions defined by the x and y axes. Herein, the number of pixels in the x-axis direction of the captured image 200 is expressed as X, and the number of pixels in the y-direction thereof is expressed as Y. Each of points α and β represents one of feature points of the tracking target 201 detected by the detection unit 303 at time tα and tβ (tα<tβ). By using the number of pixels, the point α and the point β can be expressed as a point α(xα, yα) and a point β(xβ, yβ), respectively. In other words, FIG. 4A illustrates a state where the tracking target 201 imaged by the imaging apparatus 100 by taking a point P as a center moves to the point β from the point α during a time period tβ—tα.

<Variation of Driving Method: Execute Tracking in Direction Same as Direction of Tracking Target at Different Speed>

First, a method of improving the tracking accuracy by creating a change of luminance by driving the driving unit 305 at a driving speed different from a moving speed of the tracking target 201 will be described. If the imaging apparatus 100 executes imaging at an angle of view θX in the x-axis direction and an angle of view θY in the y-axis direction, angles per one pixel are respectively expressed as θX/X and θY/Y by using the number of pixels X and Y. Herein, a motion vector of the tracking target 201, $$\vec{\alpha\beta}$$

can be expressed by the following formula (1).

$$\vec{\alpha\beta}(x_\beta-x_\alpha, y_\beta-y_\alpha) \quad (1)$$

Because the angles per one pixel are θX/X and θY/Y, the angles can be expressed by the following formula (2) when the motion vector expressed by formula (1) is converted into angles φx and yφ.

$$\varphi_x = (x_\beta - x_\alpha)\frac{\theta X}{X} \quad (2)$$
$$\varphi_y = (y_\beta - y_\alpha)\frac{\theta Y}{Y}$$

In order to track the tracking target 201 at a speed different from a speed indicated by the motion vector, $$\vec{\alpha\beta}$$

the driving unit 305 may drive the imaging apparatus 100 at driving angles θx and θy expressed by Ax and Ay (Ax=Ay≠0 and Ax=Ay≠1) in formula (3) during the time period tβ—tα.

$$\theta_x = A_x\varphi_x = A_x(x_\beta - x_\alpha)\frac{\theta X}{X} \quad (3)$$
$$\theta_y = A_y\varphi_y = A_y(x_\beta - x_\alpha)\frac{\theta Y}{Y}$$

<Variation of Driving Method: Execute Tracking by Driving Imaging Apparatus in Direction Different from Direction of Tracking Target [1]>

The control unit 302 may determine a driving angle (control value) to cause the imaging apparatus 100 to track the tracking target 201 in a direction different from a traveling direction of the tracking target 201. In this way, because the movement of the driving unit 305 is different from the movement of the tracking target 201, luminance is changed more significantly in comparison to the above-described method in which the traveling direction is the same as that of the tracking target 201 although the tracking speed is different from the moving speed of the tracking target 201, so that it is possible to improve the tracking accuracy. In the above formula (3), by satisfying a condition Ax≠Ay, the tracking target 201 can be tracked by driving the imaging apparatus 100 in a direction different from the traveling direction of the tracking target 201.

<Variation of Driving Method: Execute Tracking by Driving Imaging Apparatus in Direction Different from Direction of Tracking Target [2]>

The control unit 302 may determine a control value to change the imaging range to a direction different from the moving direction of the tracking target 201. With the above-described processing method in which the condition Ax≠Ay is satisfied in formula (3), the tracking target 201 cannot be tracked by changing the traveling direction in a case where the tracking target 201 moves parallel to the x-axis or the y-axis. Therefore, the imaging apparatus 100 may be driven at driving angles θ'x and θ'y expressed by Bx and By (Bx≠0, By≠0) in formula (4) during the time period tβ—tα.

$$\theta'_x = A_x\varphi_x - B_x$$
$$\theta'_y = A_y\varphi_y - B_y \quad (4)$$

<Variation of Driving Method: Method of Determining Variable>

In one embodiment, the control unit 302 may determine a moving amount (control value) of the driving unit 305 depending on a magnitude of speed (velocity) of the tracking target 201. If a difference between the driving angles of the driving unit 305 is small when the speed of the tracking target 201 is high, a change of luminance becomes relatively small. Therefore, in order to improve the tracking accuracy, driving angles thereof should be increased, i.e., |Log(A)| should be greater than 1. Further, if the driving angles remain large when the speed of the tracking target 201 is low, a distance between the imaging apparatus 100 and the tracking target 201 is increased easily, so that frequency of losing sight of the tracking target 201 becomes high. Therefore, in order to reduce the frequency of losing the tracking target 201, the driving angles should be increased, i.e., |Log(A)| should be close to 1. Ax and Ay may be selected from a table illustrating a relationship between the speed of the tracking target 201 and the driving angles, which is previously included in the imaging apparatus 100, or may be calculated from a speed ratio of the tracking target 201. Bx and By can also be determined in a same way.

<Variation of Driving Method: Move One Shaft>

The control unit 302 may determine a control value with respect to a control direction selected from a plurality of control directions. In other words, the control unit 302 determines a control value to change the imaging range to a specific direction based on the movement of the tracking target 201. The above-described method is mainly described with respect to the case where the driving unit 305 having a plurality of driving shafts drives the plurality of driving shafts simultaneously. However, the driving unit 305 may drive one driving shaft selected by the calculation unit 304. In this case, in order to change the luminance significantly, a driving shaft which corresponds to a direction in which the movement of the tracking target 201 is small should be selected and driven. For example, as illustrated in FIG. 4A, in a case where the tracking target 201 moves parallel to the x-axis, a change of luminance hardly occurs in the y-axis direction because the tracking target 201 does not move in the y-axis direction.

In this case, the calculation unit 304 selects the y-axis direction to cause the driving unit 305 to be driven accordingly. In other words, the calculation unit 304 selects the x-axis direction to cause the driving unit 305 to be driven in a case where a condition "xβ−xα<yβ−yα" is satisfied, and selects the y-axis direction to cause the driving unit 305 to be driven in a case where a condition "xβ−xα>yβ−yα" is satisfied. In a case where a condition "xβ−xα=yβ−yα" is satisfied, either one of the axis directions can be selected. However, in one embodiment, the calculation unit 304 selects an axis direction having a wider angle of view, in which frequency of losing sight of the tracking target 201 is low (i.e., the x-axis, in FIG. 4A), and cause the driving unit 305 to be driven accordingly. At this time, a driving angle is optional. However, in order to reduce the frequency of losing sight of the tracking target 201, the driving angle is to be smaller when the y-axis direction having a narrower angle of view is selected than the driving angle determined when the x-axis direction having a wider angle of view is selected.

<Method of Preventing Tracking Target from Moving Out of Frame>

Based on the movement of the tracking target 201, the control unit 302 determines a control value to cause a current imaging range to be changed to an imaging range where the tracking target 201 can be captured, in a case where the tracking target 201 moves out of a predetermined range within the current imaging range. In the first exemplary embodiment, the imaging apparatus 100 moves at a speed different from a speed of the tracking target 201. Therefore, after a certain period of time, the tracking target 201 moves out of the angle of view of the imaging apparatus 100 and cannot be tracked. Thus, a threshold is set to an inner side of the angle of view that can be acquired by the imaging apparatus 100. Then, in a case where the feature point of the tracking target 201 exceeds a threshold set to an edge of the angle of view in the traveling direction of the tracking target 201 expressed by formula (1), the imaging direction should be changed to cause the feature point to be captured in the edge of the angle of view in a direction opposite to the traveling direction of the tracking target 201. This method will be described with reference to FIG. 4B. For simplification, it is assumed that the tracking target 201 moves parallel to the x-axis.

Figure 4B:
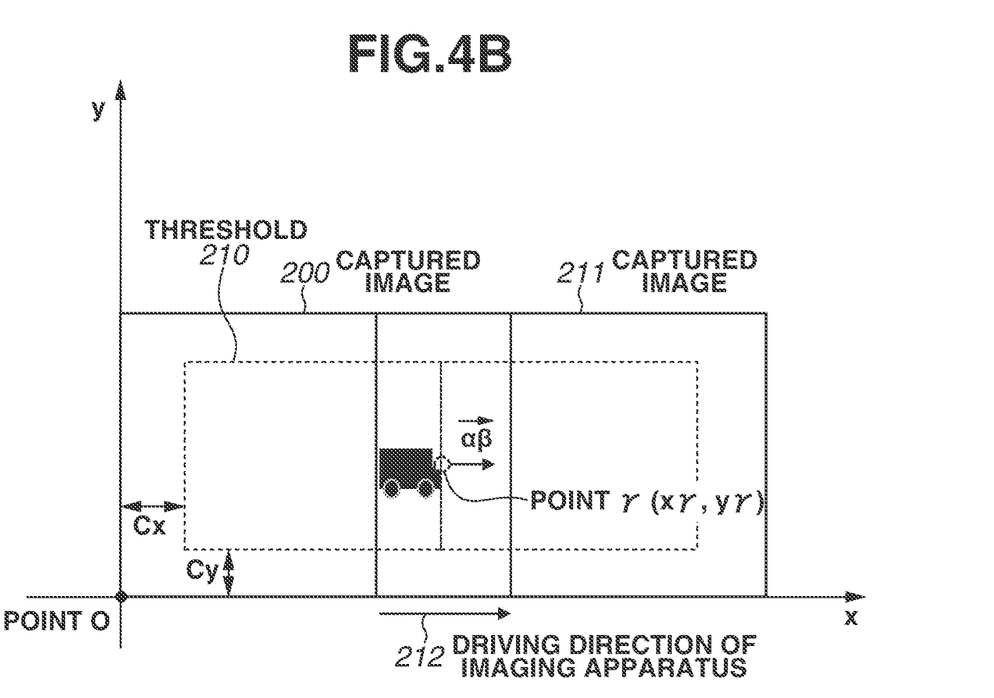

In a captured image 200, a dashed line indicates a threshold 210 for defining the edge of the angle of view. The threshold 210 can be defined by the number of pixels. In FIG. 4B, the thresholds 210 are expressed by Cx and Cy. A captured image 211 illustrates a captured image after the imaging apparatus 100 is driven in a driving direction 212 to prevent the tracking target 201 from moving out of the frame. In a case where the tracking target 201 moves to satisfy a condition xγ>X−Cx where the threshold 210 after driving the imaging apparatus 100 is Cx and the coordinates of a point γ which represents one of the feature points of the tracking target 201 is (xγ, yγ), a driving angle θ″x of the driving unit 305 can be expressed by formula (5).

$$\theta_x'' = (X - 2C_x)\frac{\theta X}{X} \tag{5}$$

In a case where the tracking target 201 moves to satisfy a condition xγ<Cx, the imaging apparatus 100 may be driven as expressed by formula (6).

$$\theta_x'' = -(x - 2C_x)\frac{\theta X}{X} \tag{6}$$

In order to prevent easily losing sight of the tracking target 201, the threshold 210 should be greater when the speed of the tracking target 201 is high.

<Execute Tracking by Estimating Movement of Tracking Target>

In one embodiment, based on the movement of the tracking target 201, the control unit 302 determines a control value to cause the tracking target 201 to be captured in the next frame image. Because time 2(tβ—tα) is necessary to drive the driving unit 305 after the driving angle is determined, the tracking target 201 moves further from a time point when the driving angle is determined. Therefore, movement of the tracking target 201 should be estimated when the driving angle of the driving unit 305 is determined. Because a moving amount of the tracking target 201 becomes double, 2φx and 2yφ are substituted for cm and yip of the above formulas (3) and (4). Accordingly, the driving angle is expressed by the following formulas (7) and (8).

$$\theta_x = A_x \times 2\varphi_x = 2A_x(x_\beta - x_\alpha)\frac{\theta X}{X} \tag{7}$$

$$\theta_y = A_y \times 2\varphi_y = 2A_y(x_\beta - x_\alpha)\frac{\theta Y}{Y}$$

$$\theta_x' = A_x \times 2\varphi_x - B_x \tag{8}$$

$$\theta_y' = A_y \times 2\varphi_y - B_y$$

<Flowchart>

Figure 5:
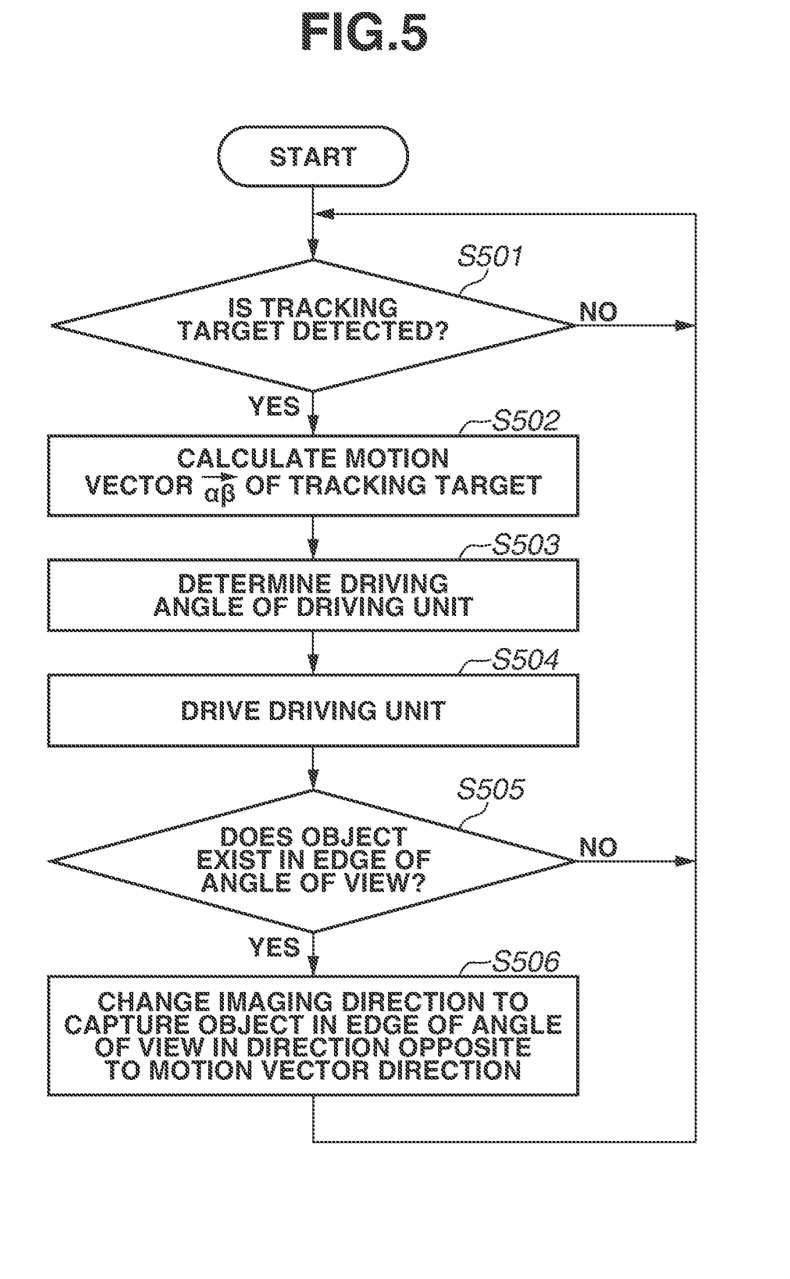
FIG. 5 is a flowchart illustrating processing executed by the information processing apparatus.

FIG. 5 illustrates an example of a flowchart which realizes the present exemplary embodiment. Processing illustrated in the flowchart in FIG. 5 is executed by the CPU 102 in FIG. 1, serving as a computer, according to a computer program stored in the memory 103.

First, in step S501, the detection unit 303 detects the tracking target 201 from an image acquired by the image acquisition unit 301. The detection unit 303 repeatedly executes the processing in step S501 until the tracking target 201 is detected. If the tracking target 201 is detected (YES in step S501), the processing proceeds to step S502.

In a case where the tracking target 201 is detected, in step S502, the calculation unit 304 estimates a motion vector of the tracking target 201. The calculation unit 304 estimates the movement of the tracking target 201 from a position history of the tracking target 201.

In step S503, the control unit 302 determines a control value of the driving unit 305 based on the estimated motion vector. The above-described method is used as a method of determining a control value.

In step S504, the control unit 302 transmits the determined control value as a driving signal to the driving unit 305, so that the driving unit 305 is driven according to the control signal.

In step S505, the detection unit 303 checks the position of the tracking target 201 in the angle of view. If the detection unit 303 determines that the tracking target 201 does not exist in the edge of the angle of view (NO in step S505), the processing returns to step S501. If the detection unit 303 determines that the tracking target 201 exists in the edge of the angle of view (YES in step S505), the processing proceeds to step S506.

In a case where it is determined that the tracking target 201 exists in the edge of the angle of view in a direction indicated by the motion vector, in step S506, the control unit 302 determines a driving angle to cause the tracking target 201 to be captured in the edge of the angle of view in a direction opposite to the direction indicated by the motion vector. The control unit 302 drives the driving unit 305 based on the driving angle. Thereafter, the processing returns to step S501, and the processing is executed repeatedly.

Through the above-described processing, tracking can be executed by driving the driving unit 305 at a speed different from a speed of the tracking target 201, so that the tracking accuracy can be improved. In other words, it is possible to improve the tracking accuracy in a case where tracking is executed by the imaging apparatus using the event-based sensor.

In the first exemplary embodiment, a method of tracking the tracking target 201 while changing at least one of the magnitude and the direction of speed has been described. In a second exemplary embodiment, a method of tracking the tracking target 201 while constantly swinging the driving unit 305 will be described. "Swing" refers to a state where frequency of driving the driving unit 305 is increased to be higher than the frequency according to the first exemplary embodiment. In other words, the control unit 302 determines a control value to cause an imaging range to be changed at a predetermined amplitude with respect to the traveling direction of the tracking target 201. Specifically, "swing" refers to a state where the driving unit 305 is driven at frequency higher than frequency for creating a single image. In comparison to the method described in the first exemplary embodiment, a change of luminance occurs more frequently by swinging the driving unit 305. Therefore, it is possible to expect further improvement in the tracking accuracy of the tracking target 201.

Figures 6A, 6B, 6C:
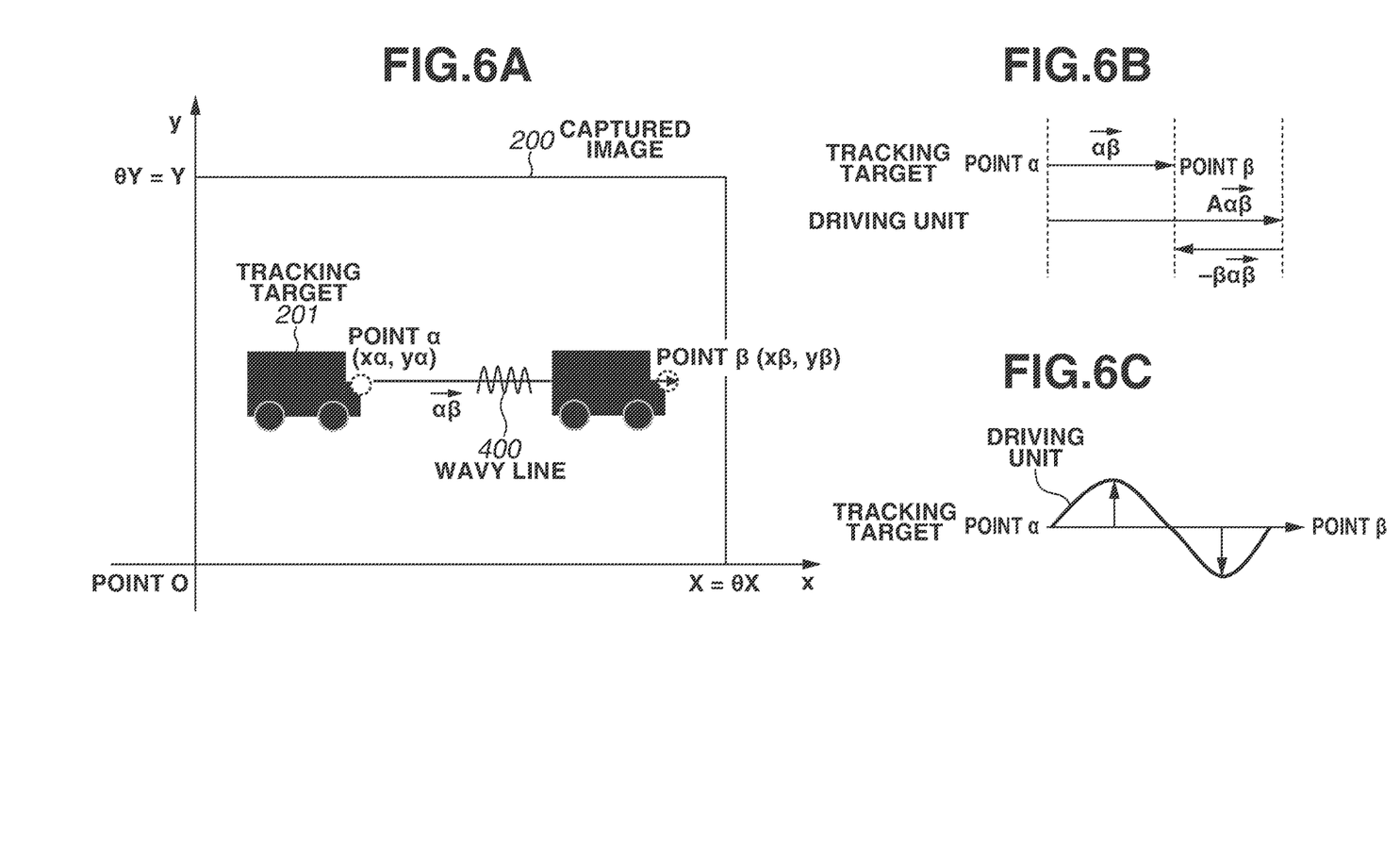
FIGS. 6A, 6B, and 6C are schematic diagrams illustrating an example of a tracking method of an object.

FIG. 6A is a schematic diagram illustrating a tracking method according to the second exemplary embodiment of the disclosure. For simplification, it is assumed that the tracking target 201 moves parallel to the x-axis. Although the processing similar to the processing described in FIG. 4A is executed up to the motion vector of the tracking target 201 is calculated, the driving unit 305 is driven while being swung periodically with respect to the motion vector as indicated by a wavy line 400 in FIG. 6A. FIGS. 6B and 6C respectively illustrate swinging directions of the driving unit 305.

First, as illustrated in FIG. 6B, there is provided a method of tracking the tracking target 201 while swinging the driving unit 305 in a forward-backward direction with respect to the traveling direction of the tracking target 201. Processing expressed by formulas (9) and (10) using D (D≠0) and time t is repeatedly executed in a time period $t_\beta - t_\alpha$ with respect to the motion vector of the tracking target 201.

$$\theta_x(t) = \frac{\theta_x}{t_\beta - t_\alpha} t + D \quad (9)$$

$$\theta_x(t) = \frac{\theta_x}{t_\beta - t_\alpha} t - D \quad (10)$$

In one embodiment, in order to increase a difference between the magnitudes of movement and to change the luminance significantly, a value D in formula (9) for driving the driving unit 305 in the traveling direction should be greater than a value D in formula (10).

Next, as illustrated in FIG. 6C, there is provided a method of tracking the tracking target 201 by swinging the driving unit 305 in a direction perpendicular to the traveling direction of the tracking target 201. Because tracking is executed while the driving unit 305 is being swung in a direction in which the tracking target 201 is not moving, the luminance is changed significantly, so that the tracking accuracy can be improved. A driving angle of the driving unit 305 can be expressed by formula (11) by using an amplitude E1 and a variable E2.

$$\theta_y(t) = \frac{\theta_y}{t_\beta - t_\alpha} t + E_1 \sin(E_2 t) \quad (11)$$

In one embodiment, the amplitude E1 should be set so as not to exceed the threshold illustrated in FIG. 6B. Further, the variable E2 should be large as much as possible. Specifically, the variable E2 should be set so as to be greater than or equal to twice the value of $1/(t_\beta - t_\alpha)$. This can also be applied to a case where the moving direction is not parallel to the x-axis.

Figure 7:
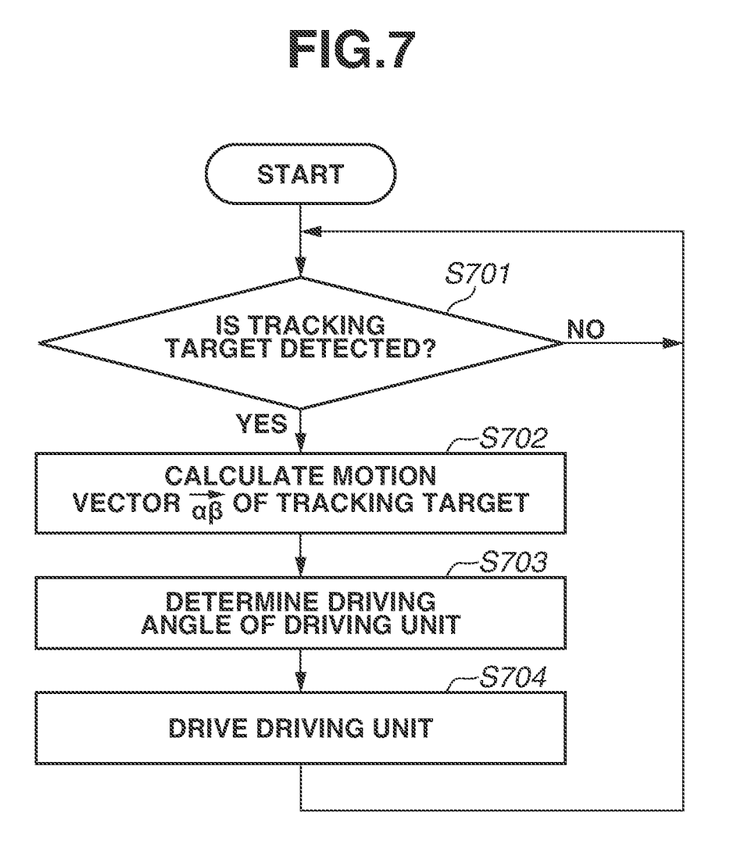
FIG. 7 is a flowchart illustrating processing executed by the information processing apparatus.

FIG. 7 illustrates an example of a flowchart which realizes the present exemplary embodiment. Processing illustrated in the flowchart in FIG. 7 is executed by the CPU 102 in FIG. 1, serving as a computer, according to a computer program stored in the memory 103. Different from the first exemplary embodiment, there is no chance of the tracking target 201 moving out of the frame. Therefore, the CPU 102 can repeatedly execute the processing by advancing the processing from step S701 to step S704. In step S701, similar to the processing in step S501, the detection unit 303 detects the tracking target 201 from an image acquired by the image acquisition unit 301. The processing in step S701 is repeated until the tracking target 201 is detected. If the tracking target 201 is detected (YES in step S701), the processing proceeds to step S702. In step S702, in a case where the tracking target 201 is detected, similar to the processing in step S502, the calculation unit 304 estimates a motion vector of the tracking target 201. In step S703, the control unit 302 determines a control value of the driving unit 305 based on the estimated motion vector. Herein, the control unit 302 determines a control value to cause the imaging range to be swung at a predetermined amplitude for a certain period. In step S704, similar to the processing in step S504, the control unit 302 transmits the determined control value to the driving unit 305 as a driving signal, so that the driving unit 305 is driven according to the control signal. As described above, by executing tracking while swinging the driving unit 305, it is possible to improve the tracking accuracy.

In a third exemplary embodiment, a solution for capturing the tracking target 201 after losing sight thereof will be described.

In one embodiment, when the tracking target 201 moves out of a frame, the tracking target 201 is likely to exist in the traveling direction up to that point. Therefore, a direction thereof should be estimated when the driving unit 305 is controlled. For example, in a case where the driving unit 305 is driven at a speed slower than a speed of the tracking target 201, the driving unit 305 is driven in the traveling direction at a speed faster than a speed of the tracking target 201. In a case where the driving unit 305 is driven at a speed faster than a speed of the tracking target 201, the driving unit 305 is driven in a traveling direction at a reduced speed, or is driven in a direction opposite to the traveling direction. Through the above-described method, the tracking target 201 can be captured promptly even if the tracking target 201 moves out of the frame, so that the tracking accuracy can be improved.

In a case where the movement of the tracking target 201 stops, a change of luminance does not occur, so that the tracking target 201 will be lost.

Therefore, if the detection unit 303 detects that the movement of the tracking target 201 has stopped, processing for controlling and swinging the driving unit 305 is to be executed.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-097308, filed Jun. 10, 2021, which is hereby incorporated by reference herein in its entirety.

What is claimed is:

1. An apparatus comprising:
   at least one processor;
   a memory coupled to the at least one processor and storing instructions that, when executed by the at least one processor, cause the at least one processor to function as:
   a detection unit configured to detect a tracking target included in an angle of view based on a signal indicating change of luminance;
   an estimation unit configured to estimate movement of the detected tracking target; and
   a determination unit configured to determine at least one of (i) a control value for changing a direction of the angle of view so that the tracking target is tracked at a speed faster or slower than a speed of the estimated movement of the tracking target and (ii) a control value for changing the direction of the angle of view to a direction different from a direction of the estimated movement of the tracking target.

2. The apparatus according to claim 1, wherein the determination unit determines a control value for changing the angle of view to cause the tracking target to be detectable from the angle of view.

3. The apparatus according to claim 1,
   wherein the signal is output from a sensor, and
   wherein, in a case where the change of luminance is not detected, the sensor does not output the signal or indicates absence of the change of luminance.

4. The apparatus according to claim 1, wherein the at least one processor further functions as an acquisition unit configured to acquire frame data which describes a pixel at which a change of luminance has occurred in a predetermined period based on the signal, and
   wherein the detection unit detects the tracking target in a case where the number of connected pixels having a change of luminance in the frame data is a threshold or more.

5. The apparatus according to claim 1 further comprising a storage unit configured to store a feature indicating the tracking target,
   wherein the detection unit detects the tracking target by comparing a feature acquired based on the signal with the stored feature.

6. The apparatus according to claim 1, wherein, based on movement of the tracking target, the determination unit determines a control value for changing the angle of view to cause an imaging range to be changed to an angle of view where the tracking target is captured, in a case where the tracking target moves out of a predetermined range in a current angle of view.

7. The apparatus according to claim 4, wherein, based on movement of the tracking target, the determination unit determines a control value for changing the angle of view to cause the tracking target to be captured in frame data generated after the frame data.

8. A method comprising:
   detecting a tracking target included in an angle of view based on a signal indicating a change of luminance;
   estimating movement of the detected tracking target; and
   determining at least one of (i) a control value for changing a direction of the angle of view so that the tracking target is tracked at a speed faster or slower than a speed of the estimated movement of the tracking target and (ii) the control value for changing the direction of the angle of view to a direction different from a direction of the estimated movement of the tracking target.

9. The method according to claim 8, wherein the determining determines a control value for changing the angle of view to cause the tracking target to be detectable from the angle of view.

10. The method according to claim 8,
    wherein the signal is output from a sensor, and
    wherein, in a case where a change of luminance is not detected, the sensor does not output the signal or indicates absence of change of luminance.

11. The method according to claim 8 further comprising acquiring frame data which describes a pixel at which a change of luminance has occurred in a predetermined period based on the signal,
    wherein the detecting detects the tracking target in a case where the number of connected pixels having a change of luminance in the frame data is a threshold or more.

12. The method according to claim 8 further comprising storing a feature indicating the tracking target,
    wherein the detecting detects the tracking target by comparing a feature acquired based on the signal with the stored feature.

13. A non-transitory computer-readable storage medium storing a program for causing a computer to execute a method, the method comprising:
    detecting a tracking target included in an angle of view based on a signal indicating a change of luminance;
    estimating movement of the detected tracking target; and
    determining at least one of (i) a control value for changing a direction of the angle of view so that the tracking target is tracked at a speed faster or slower than a speed of the estimated movement of the tracking target and (ii) the control value for changing the direction of the angle of view to a direction different from a direction of the estimated movement of the tracking target.

14. The non-transitory computer-readable storage medium according to claim 13, wherein the determining determines a control value for changing the angle of view to cause the tracking target to be detectable from the angle of view.

15. The non-transitory computer-readable storage medium according to claim 13,
wherein the signal is output from a sensor, and
wherein, in a case where a change of luminance is not detected, the sensor does not output the signal or indicates absence of change of luminance.

16. The non-transitory computer-readable storage medium according to claim 13 further comprising acquiring frame data which describes a pixel at which a change of luminance has occurred in a predetermined period based on the signal,
wherein the detecting detects the tracking target in a case where the number of connected pixels having a change of luminance in the frame data is a threshold or more.

17. The non-transitory computer-readable storage medium according to claim 13 further comprising storing a feature indicating the tracking target,
wherein the detecting detects the tracking target by comparing a feature acquired based on the signal with the stored feature.

* * * * *